Sept. 30, 1941.  J. F. MALONEY  2,257,344
SCREEN PIPE
Filed Jan. 11, 1940

Joe F. Maloney.
INVENTOR.
BY
ATTORNEY.

Patented Sept. 30, 1941

2,257,344

UNITED STATES PATENT OFFICE 2,257,344

SCREEN PIPE

Joe F. Maloney, Houston, Tex.

Application January 11, 1940, Serial No. 313,319

2 Claims. (Cl. 166—5)

This invention relates to screen pipe for use in wells, and has for its particular object the provision of a screen pipe which will incorporate the various advantages of the use of gravel for screening purposes.

Screen pipe generally consists of a metal pipe having openings cut or pierced therein at frequent intervals, so as to permit the inflow of fluid through said openings while at the same time preventing the entrance of sand from the producing formation which would tend to clog up the flow pipe and impair the production of the well.

In certain cases, after such a screen pipe has been set in position, a body of gravel has been placed within the well about the outside of the pipe in order to stop or retard the entrance of sand and in order to prevent the packing of sand or other formation around the screen thus closing the openings in the screen and preventing proper flowing of the well.

It is an object of this invention to provide a screen pipe which will incorporate both the advantages of the metal pipe form of screen and the advantages of the gravel screen.

It is a further object of this invention to provide such a device which may be made up in a factory or the like, transported to the field in units of more or less conventional length with the gravel in place within each unit, and to join these units together easily and in substantially conventional manner as the same are placed in the well.

Another object of this invention is to provide a gravel screen pipe which may be easily and cheaply manufactured, and which will be rugged in service and easy to transport and use.

Other objects and advantages will become apparent from the following description taken in connection with the accompanying drawing, in which.

Figures 1, 2, 3:
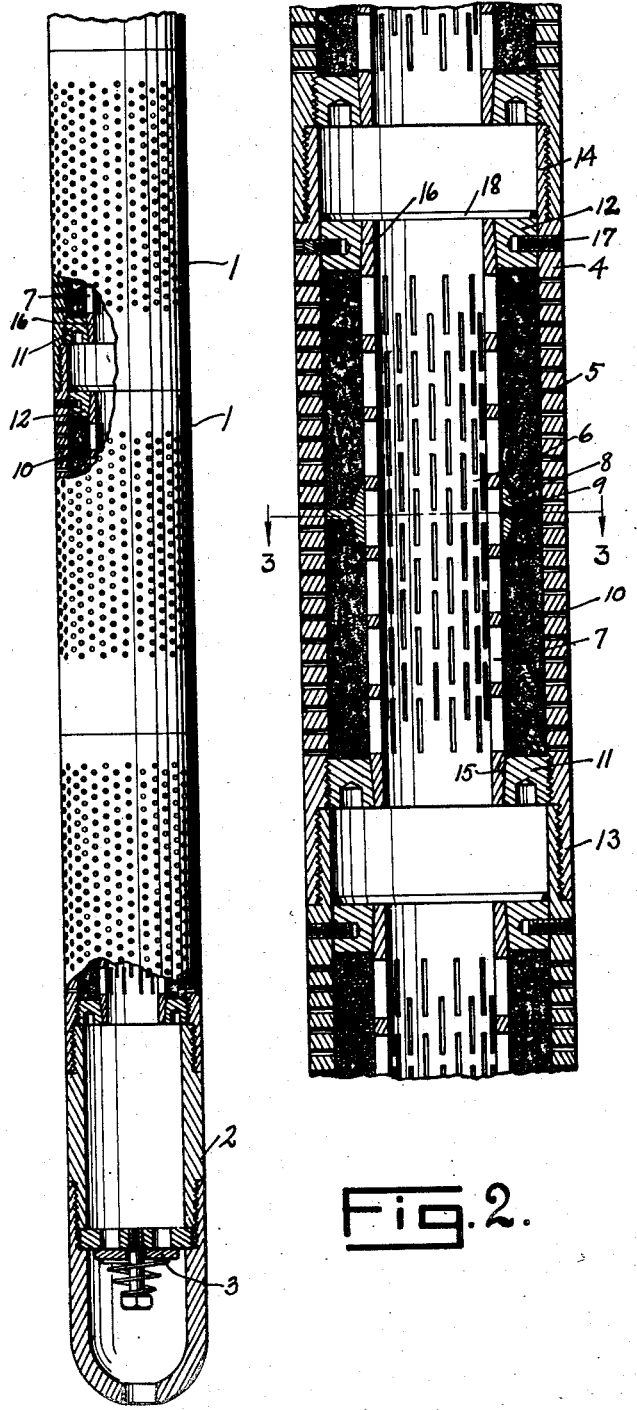
Fig. 1 is a side elevation with part broken away and shown in cross section, illustrating a screen pipe constructed in accordance with this invention, with a set shoe threaded to the lower end thereof.
Fig 2 is an enlarged longitudinal cross section of the same structure.
Fig. 3 is a transverse cross section taken along the line 3—3 of Fig. 2.

With reference to Fig. 1, it will be seen that the screen pipe of this invention is made up in sections designated generally by the numeral 1, and may have connected to its lower end any conventional set shoe structure such as generally indicated at 2 and which ordinarily contains a back pressure valve 3 which permits downflow from within the screen but prevents upflow into the screen through the bottom thereof.

Referring now to Figs. 2 and 3, each section of screen pipe consists of an outer pipe 4 having perforations 5 therein, an inner pipe 6 having slotted openings 7 therein, a spacing spider 8 interposed between the two pipes and secured in place by a set screw 9, a body of gravel 10 between the two pipes, and rings 11 and 12 closing the ends of the annular space between the two pipes for the purpose of retaining gravel therein.

The outer pipe is preferably threaded internally at one end, as shown at 13, and externally at the other end, as shown at 14, for connection with adjacent annular sections of the gravel screen pipe. The inner pipe is preferably made slightly shorter than the outer pipe and is formed with a slight bevel 15 and 16 on its exterior surface adjacent its opposite ends.

In assembling the gravel screen pipe according to this invention, the ring 12 may first be secured within the outer pipe 4 by any suitable means, such as the screws 17 or the welding 18, or both. The spacing ring 8 having special projections 19 extending radially therefrom will then be secured on the inner pipe 7, and it will be understood than any number of such rings may be employed as found necessary or desirable and positioned wherever found desirable upon a single length of inner pipe. The inner pipe would then be inserted into the outer pipe from the end opposite the ring 12 until the tapered end 16 of the inner pipe fits within the opening through the ring 12, which is preferably tapered and formed to provide a close fit between these parts.

With the inner pipe in place within the outer pipe, the annular space between the two will then be filled with the gravel 10, after which the ring 11 will be screwed into place within the outer pipe until it comes into wedging engagement with the tapered outer surface of the end portion of the inner pipe 6. Preferably, the walls of the opening through the ring 11 will likewise be tapered and formed to provide a close fit with respect to the tapered surface on the pipe 6.

It will be seen from the foregoing that sections of gravel screen pipe may be made up in a factory under supervision so as to provide assurance that all parts will be assembled in the proper manner, and these sections of gravel screen pipe may then be transported as units to the well and then joined together and joined to the other parts customarily used with screen pipe, and inserted into the well. It will be seen that the gravel screen pipe provided by this invention may be used in the same manner as any ordinary screen pipe and coupled and uncoupled with the same tools without danger of losing the gravel or of causing some maladjustment that would impair is usefulness.

Having described my invention, I claim:

1. In a well screen, an outer perforated pipe, an inner perforated pipe having its exterior surfaces tapered adjacent the ends of the inner pipe, a body of gravel substantially filling the annular space between said pipes, and a pair of annular retaining rings secured in the outer pipe and substantially closing the ends of the annular space between said pipes and retaining the gravel in place, the openings in said annular retaining rings being of a diameter less than the external diameter of the inner pipe and greater than the external diameter of the free tapered ends of said inner pipe to receive only the tapered end portions of said inner pipe and means for forcing one of said rings toward the other whereby said inner pipe will be gripped between said retaining rings and held in position against axial displacement.

2. In a well screen, an outer perforated pipe, an inner perforated pipe having its exterior surfaces tapered adjacent the ends of the inner pipe, a body of gravel substantially filling the annular space between said pipes, an annular retaining ring substantially closing one end of the annular space between the pipes and having a tapered central opening to receive the corresponding tapered end of the inner pipe, means for fixing said retaining ring in the corresponding end of the outer pipe, a second annular retaining ring substantially closing the other end of said annular space, having a tapered central opening to receive the corresponding end of the inner pipe, and cooperating screw threads on the outer periphery of said second retaining ring and on the interior of the outer pipe for axially displacing said second retaining ring, upon rotation, toward the first recited ring to force the tapered ends of the inner pipe into the tapered openings of the retaining rings and grip said inner pipe tightly between said retaining rings.

JOE F. MALONEY.